United States Patent
Michels

(10) Patent No.: US 8,356,965 B2
(45) Date of Patent: Jan. 22, 2013

(54) APPARATUS FOR CONVEYING AND LIFTING A GROUP OF CONTAINERS

(75) Inventor: Frank Michels, Kleve (DE)

(73) Assignee: Msk-Verpackungs-Systeme GmbH, Kleve (DE)

( * ) Notice: Subject to any disclaimer, the term of this patent is extended or adjusted under 35 U.S.C. 154(b) by 935 days.

(21) Appl. No.: 11/906,320

(22) Filed: Oct. 1, 2007

(65) Prior Publication Data

US 2008/0088143 A1 Apr. 17, 2008

(30) Foreign Application Priority Data

Oct. 4, 2006 (DE) ............. 20 2006 015 281 U

(51) Int. Cl.
*B66B 17/00* (2006.01)

(52) U.S. Cl. ........................... 414/568; 198/600

(58) Field of Classification Search .......... 414/924, 414/620, 788, 792.8, 793.1, 793.4, 791.6, 414/799, 568; 198/418, 426, 406, 413, 419.1, 198/429, 620, 432, 463.3, 468.11, 600, 851, 198/845, 468.8, 772, 773, 775
See application file for complete search history.

(56) References Cited

U.S. PATENT DOCUMENTS

| | | | | |
|---|---|---|---|---|
| 2,180,284 A | * | 11/1939 | Meyer | 198/601 |
| 2,237,345 A | * | 4/1941 | Frentzel, Jr. et al. | 198/600 |
| 3,464,481 A | * | 9/1969 | Hartzell, Jr. | 164/269 |
| 3,610,394 A | * | 10/1971 | Sager | 198/866 |
| 3,807,553 A | * | 4/1974 | Billett et al. | 209/565 |
| 4,214,848 A | * | 7/1980 | Verwey et al. | 414/793.5 |
| 4,273,234 A | * | 6/1981 | Bourgeois | 198/347.3 |
| 4,709,799 A | * | 12/1987 | Ljungberg | 198/412 |
| 4,753,564 A | * | 6/1988 | Pearce et al. | 414/796 |
| 5,073,081 A | * | 12/1991 | Johnson | 414/802 |
| 5,439,094 A | * | 8/1995 | Hakansson | 198/419.1 |
| 6,582,180 B2 | * | 6/2003 | Fochler et al. | 414/797.9 |
| 7,581,919 B2 | * | 9/2009 | Bolzani | 414/799 |
| 2005/0265817 A1 | * | 12/2005 | Blanc | 414/799 |

* cited by examiner

*Primary Examiner* — Dean Kramer
*Assistant Examiner* — G. M.
(74) *Attorney, Agent, or Firm* — Andrew Wilford

(57) ABSTRACT

A device for lifting a plurality of rows of containers has a base and a lifter with a transport surface formed like a blind and displaceable parallel to the base and provided with a frame. The surface slipped under the layer by feeding the containers into the frame. Prior to raising the layer, the lifter is moved toward the layer so that the transport surface is located with its front edge in front of the first row of the layer and is then moved underneath the layer into its lifting position by relative movement with respect to the containers. A partial region of the base is underneath every container at any point in time and the edge of the transport surface is shifted downward to form a clearance is given between the bottoms of the containers of the row and the base.

4 Claims, 21 Drawing Sheets

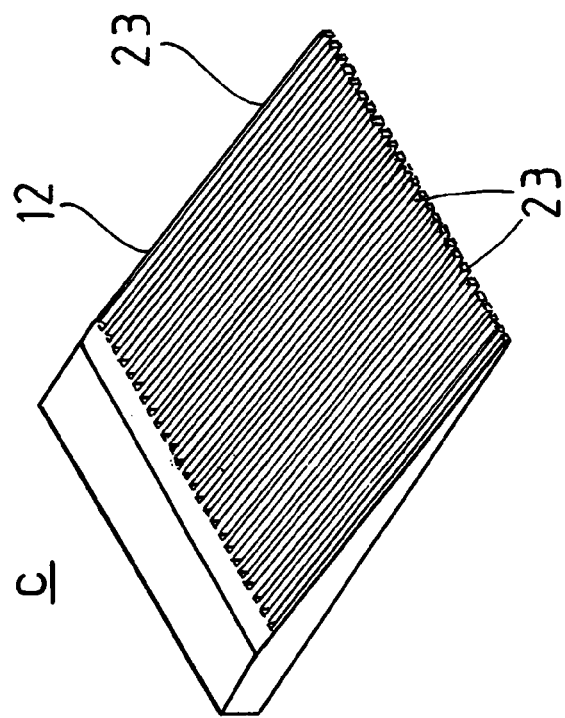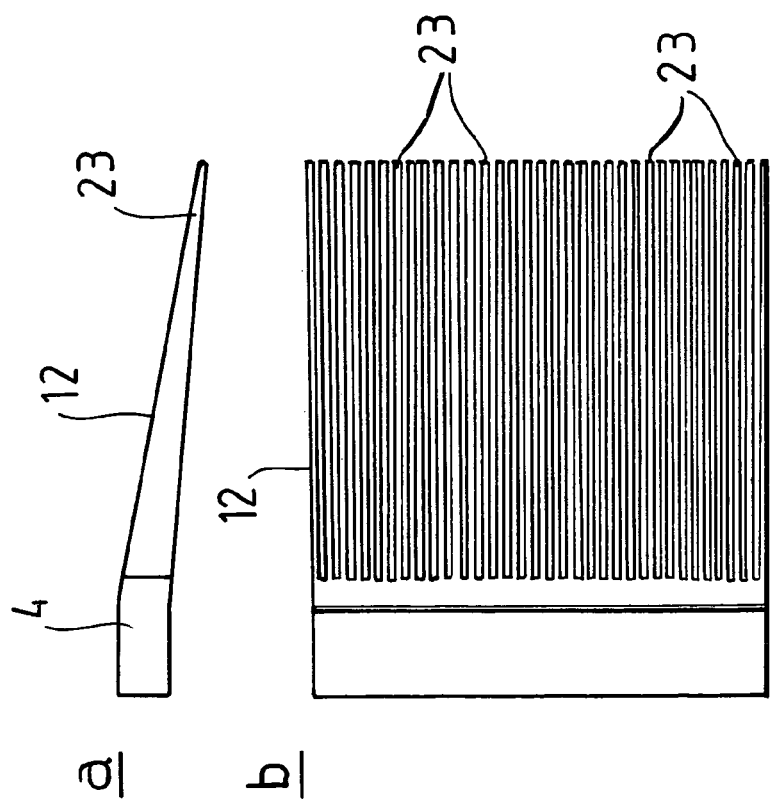
FIG.18

APPARATUS FOR CONVEYING AND LIFTING A GROUP OF CONTAINERS

FIELD OF THE INVENTION

The invention relates to a device for lifting a layer consisting of a plurality of containers or the like, in particular consisting of a plurality of rows of containers or the like that are preferable arranged in parallel next to one another, comprising a base and a lifting device, wherein the lifting device has a transport surface that is embodied in particular as a blind that can be displaced parallel to the base and preferable also comprising a frame that is embodied in such a manner that the frame can be wrapped around by being slipped around the layer of the containers or by feeding the containers into the frame, wherein, prior to the lifting of the layer, the lifting device is moved toward the layer in such a manner that the transport surface that has not yet been extended into its lifting position, is located with its front edge in front of the first row of the layer and is then moved underneath the layer into its lifting position by a relative movement with respect to the containers underneath the containers standing on the base. Containers also include individually packaged goods, such as, e.g., cans, bottles, hollow glass, container glass or buckets that encompass a platform on the lower side, with which they can be set up on a base.

BACKGROUND OF THE INVENTION

In the industry, for example in the glass industry or in the container industry, the produced containers, such as, e.g., bottles, must be moved from a base to a pallet. On the pallet, a plurality of container layers that are then later secured by a film tube, which is slipped thereover, are then stacked on top of one another. Typically, the base is a revolving conveyor belt that transports the containers. The containers are then piled up on a platform that corresponds to the pallet size, by a stop. This region is also called the accumulation region. As soon as a layer of containers is complete, the containers are picked up by a lifting device and are deposited on a pallet and on the upper layer of a stack of pallets that has already been deposited, respectively.

In a known device, a displacement table that is height-adjustable, borders on the accumulation region for this purpose. The layer of individually packaged goods, such as containers, is horizontally pushed onto the displacement table. Then, the displacement table, which in turn borders on the pallet, is displaced into the desired height so that the layer of individually packaged goods, such as containers, is pushed onto the pallet in a last step or—provided that a plurality of layers are already stacked on top of one another on the pallet, is pushed onto the intermediate floor panel, which was placed onto the last deposited layer on the upper side.

A disadvantage is hereby that, due to the displacement table that must additionally be height-adjustable, such devices require an increased amount of space. Furthermore, the possibilities of disposing the accumulation region and the depositing region are limited because of the displacement table that is disposed therebetween. In addition, such devices can be used only to a limited extent, for example for containers with very small diameters, because of the transitions between the accumulation region and the displacement table on the one hand and the displacement table and the depositing region on the other hand.

OBJECT OF THE INVENTION

It is the object of the invention to avoid the afore-mentioned disadvantages and to specify a device that makes it possible, with a small space requirement, to move the individually packaged goods, such as containers or cans, for example, from the layer table and the accumulation region, respectively, into the depositing region, that is, onto the pallet, without considerably changing a layer pattern created on the layer table. At the same time, the device is to also enable the movement of containers of different diameters and/or shapes, without requiring an adaptation.

SUMMARY OF THE INVENTION

This object is solved in that the device is embodied in such a manner that a partial region of the base is located underneath each container at every point in time and where at the row of containers, underneath which the transport surface is relocated next, a clearance is given at least on its side facing the transport surface between the bottoms of the containers of this row and the base, in particular the clearance was preferably created only temporarily so that the transport surface can be guided underneath the containers of the row. By means of the clearance, which is given and created, respectively, on the side of the base that faces the transport surface between the bottoms of the containers of the row and the base, the base can be guided down, without touching the containers laterally while moving the transport surface downward, which can lead to damages.

With a possible embodiment of the device, the containers of the row can be tiled on the upper side, for example by a stop that can be displaced in vertical direction, by tapping so that a clearance can thus be created and so that the base can thus be passed from below. Other constructive measures for creating a clearance are possible.

The device as claimed in the invention thus allows for a direct take-over of the containers from the accumulation table and the accumulation region, respectively, so that a displacement table, which requires additional space, is no longer required, as was the case until now. At the same time, the device as claimed in the invention enables such a takeover, where the layer pattern created on the layer table and the accumulation table, respectively, is not considerably changed in response to the takeover. Containers with different diameters and shapes, respectively, can also be taken over by the device as claimed in the invention, without requiring a special adaptation, such as, e.g., other gripper tools or suction plates, on the objects that are to be taken over.

The containers of adjacent rows can be disposed to one another according to the type of a chessboard. However, it is also quite possible that adjacent rows are arranged to one another offset by half of the diameter of a container. The outer contour of the layer is also arbitrary. It goes without saying that other layer patterns are also possible.

On its surface facing the transport surface in the region, which, on the one hand, borders on the row of containers, underneath which the transport surface is relocated next and, on the other hand, faces the transport surface, which was not yet passed from below, the base can encompass at least one recess and the transport surface at the front edge in conveyor direction can have at least one front edge region that is embodied in such a manner and which, in response to a movement of the transport surface into its lifting position, can be inserted into the corresponding recess and can, in this respect, be passed underneath the row of containers. The insertion of the respective front edge regions of the front edge into the corresponding recess, the transport surface can simply be passed underneath the row of containers, because the containers of this row are not contacted in the region of their side walls.

Preferably, provision can be made for a plurality of recesses that are oriented parallel to the conveyor direction and which are embodied in a groove-shaped manner. Provided that the base is stationary, the recesses must extend across the complete length of the layer. This must not be the case, if, for example, the base together with the transport surface moves in conveyor direction when the transport surface is passed from below.

At least one recess can be embodied as a groove that is orthogonal to the conveyor direction. Due to the fact that the front edge is located in the recess when being passed from below, the base must be moved synchronously with the transport surface when passing the transport surface from below in conveyor direction. It is obvious that the recess must not be embodied to be continuous across the entire width of the base and of the row of containers, respectively. It is quite possible that provision is made for recess partial regions at least at the same spacing from the containers along the row, wherein the front edge with the correspondingly embodied front edge regions can be inserted into the corresponding recess partial regions. The distance of the recess partial regions and the width of the recess partial regions is a function of the diameter and of the dimensions of the containers, respectively.

Preferably, the base can be embodied to be flexible, at least in displacement direction. It goes without saying that the base can also be embodied to be flexible orthogonally to the displacement direction. In such an embodiment, the base is embodied as a conveyor belt, for example.

The base can be embodied as a conveying surface that can be moved in the displacement direction and which preferably consists of a plurality of segments that are connected with one another in an articulated manner via elements by axles that are oriented perpendicular to the displacement direction. If a segment extends across the complete width of the base, for example, provision can be made for a continuous groove as a recess.

It goes without saying that the recesses can also extend parallel to the conveyor direction. In such a case, the base can also be stationary. The transport surface extends with the front edge regions into the respective recess and can be passed underneath the row of containers. The distance of the recess oriented parallel to the conveyor direction is a function of the size of the containers.

In the alternative, provision can be made for a base lifting device that lifts the base, wherein the base lifting device in conveyor direction in the region which, on the one hand, borders on the row of containers, underneath which the transport surface is relocated next and, on the other hand, faces the transport surface that was not yet passed from below that is disposed at a slight distance from the front edge of the transport surface and which is disposed so as to be displaceable synchronously with the transport surface that can be displaced in the lifting position. The distance of the base lifting device to the row of containers, underneath which the transport surface is relocated next, is smaller than half of the diameter of the containers that are to be lifted, and half of the depth of the individually packaged goods that are to be lifted, respectively. A clearance is initially created by the base lifting device so that the transport surface can then be passed from below.

The base lifting device can be coupled with the transport surface via a connecting element that creates a constant distance.

In the alternative, the base lifting device can be displaced via a separate drive.

So that the base lifting device can be moved back into its initial position after reaching the lifting position of the transport surface in a simpler manner, it lends itself for the base lifting device to be positioned so as to be capable of being lowered. This is so because the base is no longer lifted when the base lifting device is moved back, due to the lowering.

The base lifting device can be embodied as an elevation, which is laterally flattened, preferably in the cross-section at least in conveyor direction and which extends across the entire width of the row. The base lifting device must not have the same height across the entire width of the row.

Preferably, the base lifting device can consists of at least two surface elements that are located in one plane that can be moved relative to one another in the plane into a position, in which they are fit into one another on the one hand and in an adjoining position on the other hand, wherein the edges of the respective surface elements each pointing toward one another are embodied in a comb-shaped manner and encompass surface partial regions that are disposed offset to one another and protruding in the plane. Upon moving the lifting device toward the layer of containers that is to be accommodated, the surface elements are in the mutually adjoining position. The transport surface together with the adjoining surface element is then displaced in a synchronous manner. In response to this relative movement, the two comb-shaped surface elements are displaced into one another. Once the transport surface reaches its lifting position, the surface elements are in a position, in which they are fit into one another. Instead of the comb-shaped embodiment of the edges of the respective surface elements that each point toward one another, other embodiments, for example scissor mechanisms, are, of course, also possible. They are embodied in such a manner that the containers are held in the mutually adjoining position of the surface elements as well.

Preferably, the conveying edge of the transport surface can encompass a surface that runs downward to the free end and in a sloped manner downward to the base, so as to simplify even more the passing from below due to the tapering front edges.

The containers of this row can thereby be lifted at least in the region of their side that faces the transport surface. It goes without saying that the containers of this row can also be lifted in their entirety.

In the alternative, the base can be lowered in the region that, on the one hand, borders on the row of containers, underneath which the transport surface is relocated next and which, on the other hand, faces the transport surface that was not yet passed from below. It goes without saying that a lowering of the base in combination with a lifting of the containers of this row is also possible at least in the region of its side that faces the transport surface.

With the containers of this row, a clearance can initially only be created on its side that faces the transport surface and the orientation of the containers can be changed, in particular in response to an underpassing of the transport surface caused by a contact of the front edge of the transport surface with at least one region of the underside of the containers. The creation of the clearance in the first step can occur with or without a change of the orientation of the containers. If, for example, the containers in this row are initially lifted slightly only on their side that faces the transport surface, whereby the orientation of the containers of this row changes, the orientation of the containers is once again changed in response to guiding the transport surface downward in response to a contact of the front edge of the transport surface with at least one region of the underside of the containers.

In the alternative, such a clearance between the bottoms of the containers of this row and the base can be created with the row of containers, underneath which the transport surface is relocated next, such that, upon underpassing the transport surface, the orientation of the containers remains substantially unchanged. With such a process, the created clearance is sufficient for maintaining the orientation of the containers that are spaced apart by means of a clearance to the transport surface, in response to an underpassing of the transport surface.

The row of containers, underneath which the transport surface is relocated next, can be located approximately orthogonally to the conveyor direction on the plane of the transport surface. It goes without saying that the front edge of the transport surface can also be oriented in an angle that does not equal 90° to the conveyor direction so that the containers of the row, underneath which the transport surface is to be guided next, are located in "different" rows, as compared to the layer. It goes without saying that, with a corresponding constructive embodiment, the row of containers, underneath which the transport is surface is relocated next, can also be embodied in a different manner, such as, e.g., in a zigzag.

Provision can be made for a conveyor belt as a base, on which the layer of containers is created with the desired layer pattern by piling or by a further device. For example, the containers can be piled up in front of a stop that is oriented in particular at right angles to the conveying device, or they can be assembled free and with zero pressure by the device. It goes without saying that, in such an embodiment, only a partial region of the conveyor belt is underneath the layer at any given point in time. In response to a movement of the conveyor belt, the containers are piled up in front of the stop until a full layer is produced. Then, the lifting device is moved toward the layer in such a manner that the transport surface that has not yet been extended into its lifting position, is located with its front edge in front of the first row of the layer and is then moved underneath the layer into its lifting position by a relative movement with respect to the containers underneath the containers standing on the base.

BRIEF DESCRIPTION OF THE DRAWING

Specific embodiments of the invention illustrated in the drawings will be explained below:

FIG. 14-FIG. 18 show a third embodiment of a device according to the invention, FIG. 19+FIG. 20 show a fourth embodiment of a device according to the invention.

Corresponding reference numerals are used in all of the figures for the same and similar components.

FIG. 1 is a top view onto a palletizer. A conveyor belt forming a support 1 is located in the left-hand part of FIG. 1. As in FIG. 2 to FIG. 21, the conveyor belt 1 is revolving and is deflected between two unillustrated deflection rollers. At the same time, the part of the conveyor belt 1 illustrated in FIG. 1 forms the accumulating region. A layer of containers 2 is stacked up in front of an unillustrated stop in the accumulating region.

Figure 1:
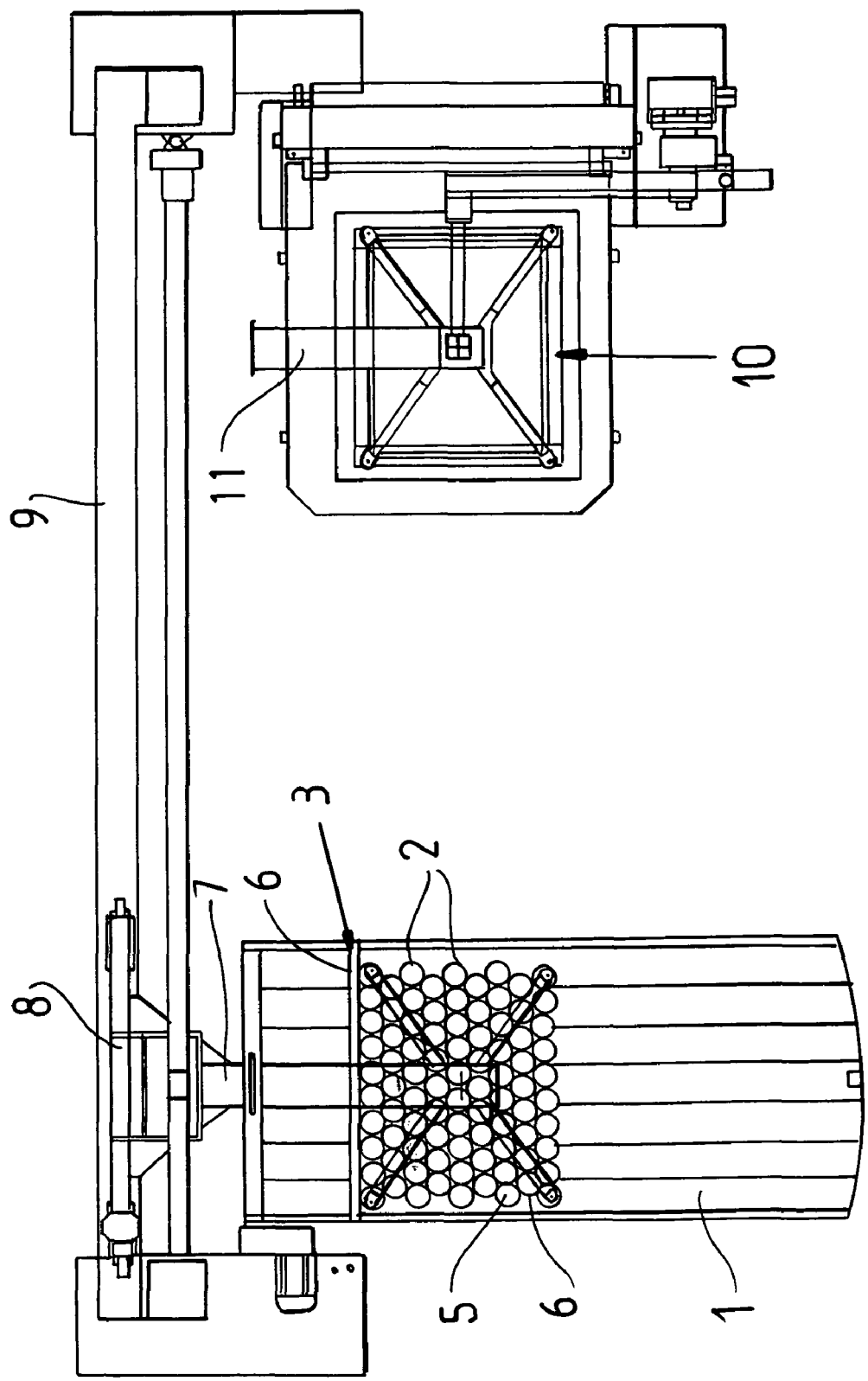
FIG. 1 shows a top view of a palletizer comprising an accumulation table and a depositing region.
Figure 2:
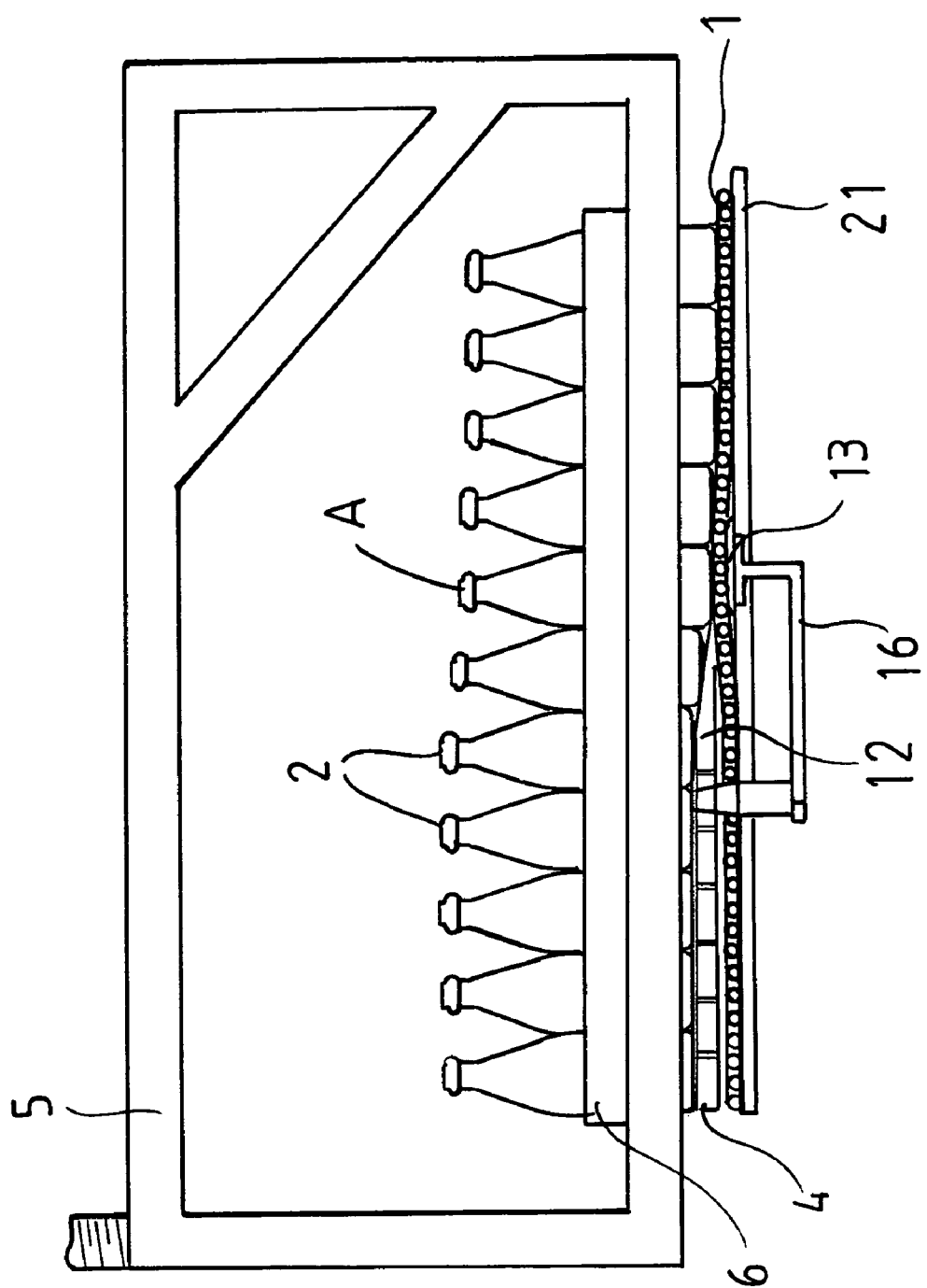
FIG. 2-FIG. 7 show a first embodiment of a device according to the invention.
Figure 3:
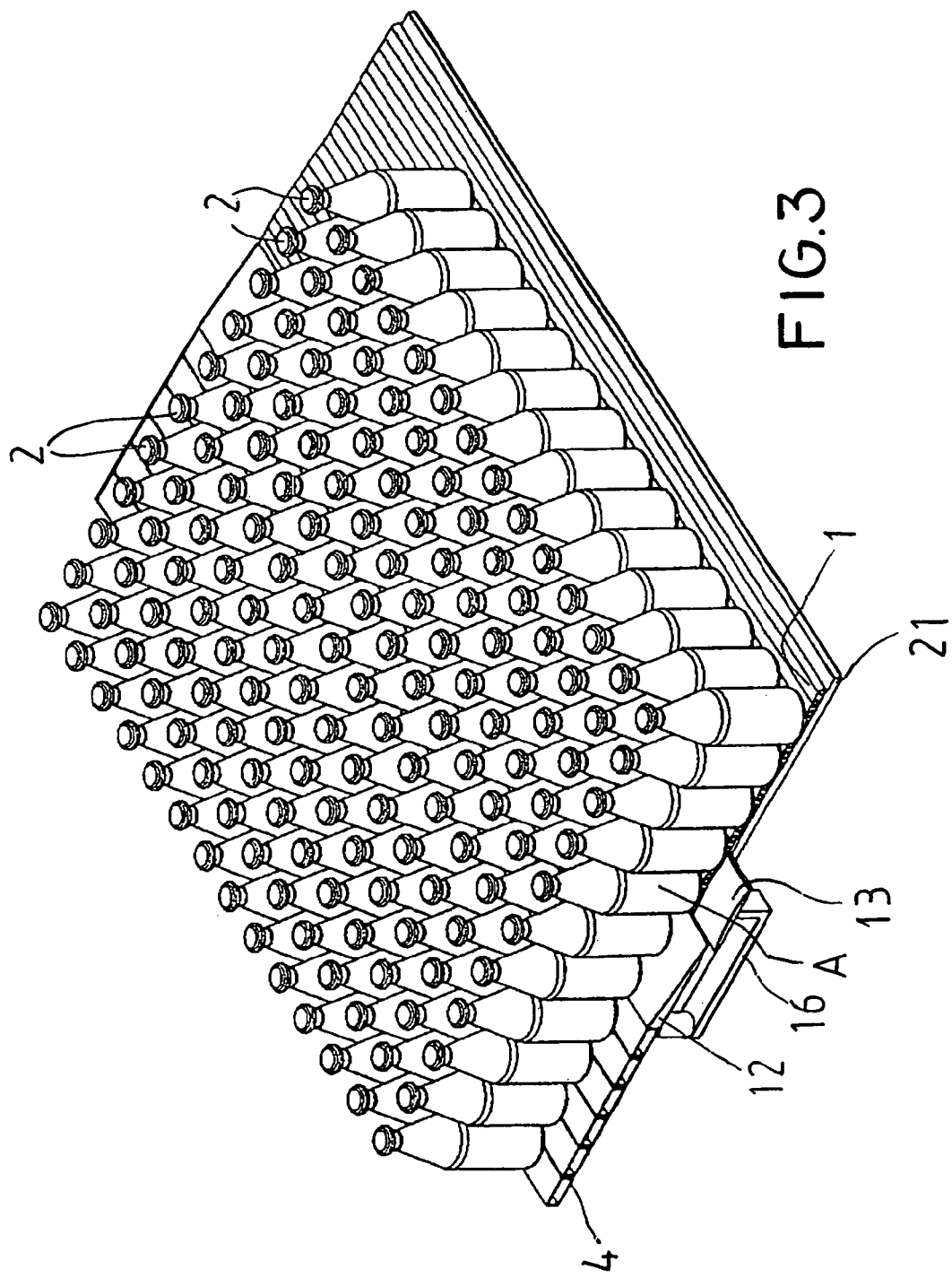
Figure 4:
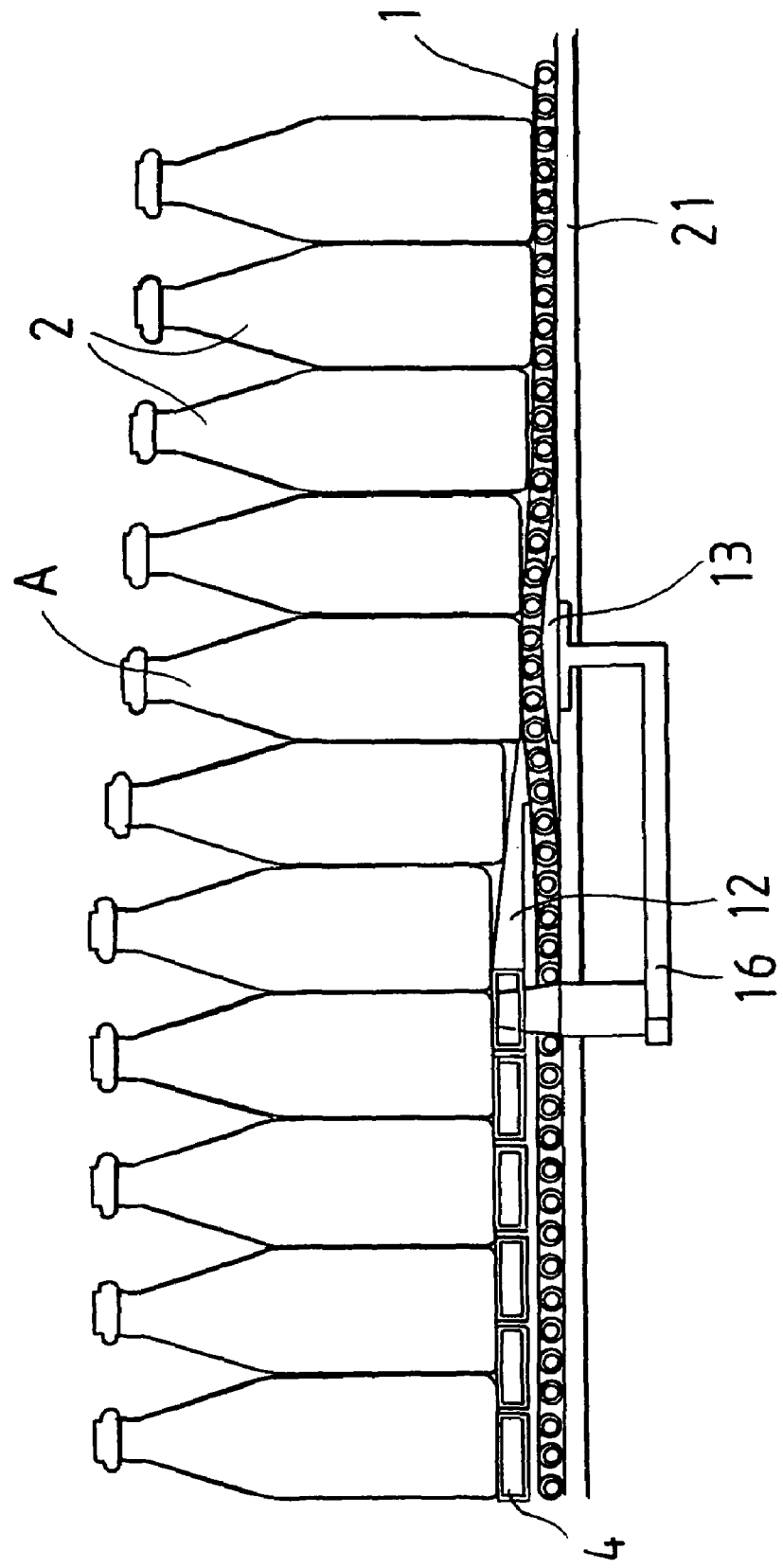

Furthermore, provision is made for a lifting device 3 having a transport surface 4 that can be moved parallel to the base 1, that is embodied as a blind and that has a frame 5. In the illustrated embodiment, the frame 5 has four flanges 6 that can be moved for the purpose of a subsequent centering of the containers 2 in the direction of the center of the layer.

The lifting device 3 is fastened to a displacement carriage 8 by a support structure 7. The support structure 7 permits a lifting of the lifting device 3 in vertical direction. For a horizontal displacement, the displacement carriage 8 is positioned on a displacement structure 9 so as to be displaceable. The depositing region, in which the layers are deposited on a pallet 10, is located parallel to and at a spacing from the accumulation region.

So that layers of containers 2 that are stacked on top of one another, are not in direct contact with one another, an intermediate floor panel is placed on the upper side onto an already deposited layer by a suggested intermediate floor-panel application device 11 before the next layer is deposited.

After depositing the layer, the lifting device 3 is again moved back to the accumulation table. Prior to lifting the layer, the lifting device 3 is moved toward the layer that is to be lifted in such a manner that the transport surface 4 that has not yet been extended into its lifting position is positioned with its front edge 12 in front of the first row of the layer and is then moved underneath the layer into its lifting position by relative movement with respect to the containers 2 underneath the containers 2 standing on the base 1. After the new layer has been lifted, the lifting device 3 is again moved into the depositing region and the layer is deposited on the intermediate floor panel. This process is repeated until the desired number of layers has been deposited. Then, the palette 10 carrying the layers is transported away and a new palette 10 is deposited in the depositing region.

FIG. 2 to FIG. 7 illustrate an embodiment where provision is made for a base lifting device 13 underneath the base 1. The base lifting device 13 is embodied as a raised surface that is laterally flattened, preferably in the cross-section at least in conveyor direction 14 and that extends across the entire width of the row. The base lifting device 13 is disposed underneath the conveyor belt that forms the base 1.

Figure 5:
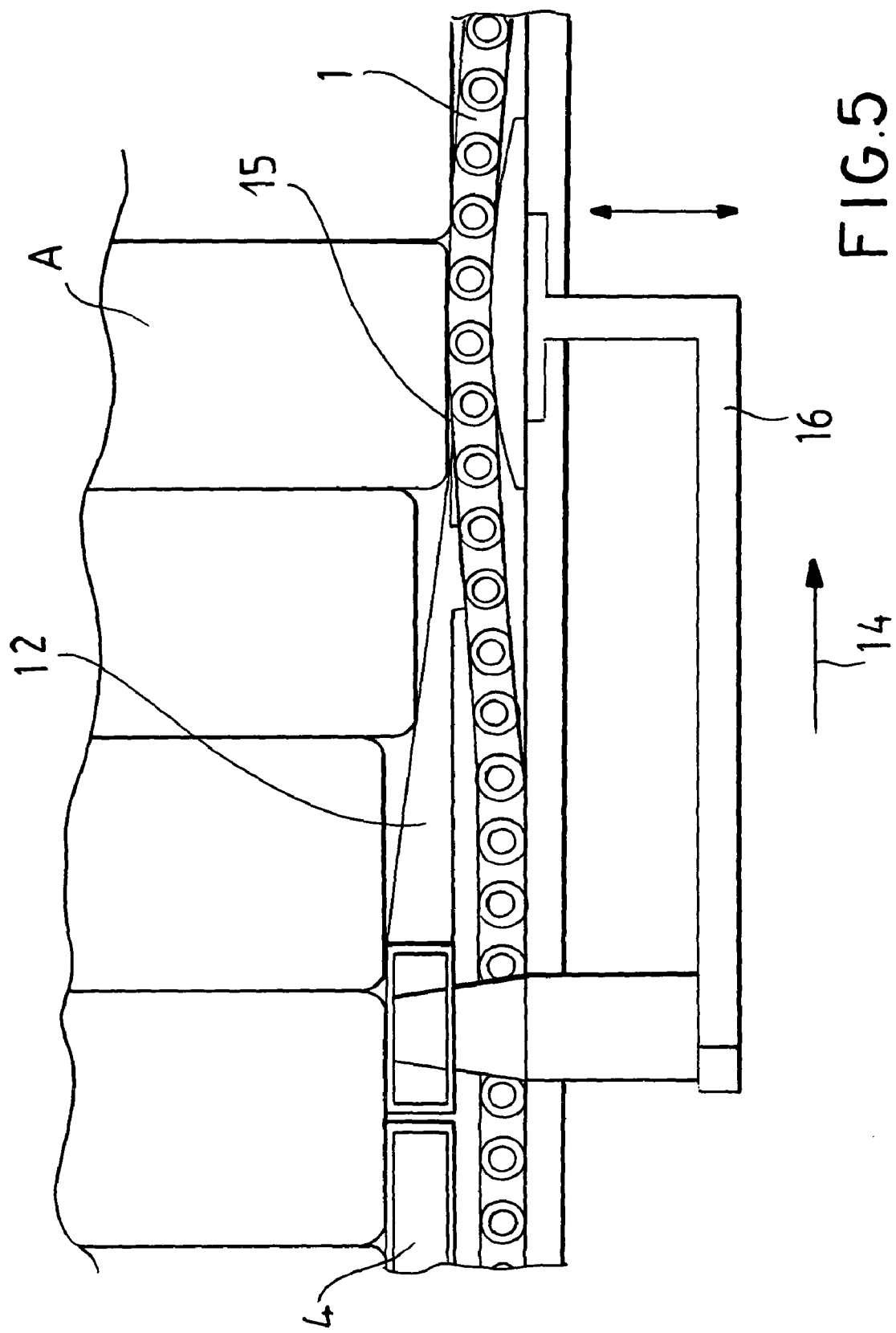
Figure 7:
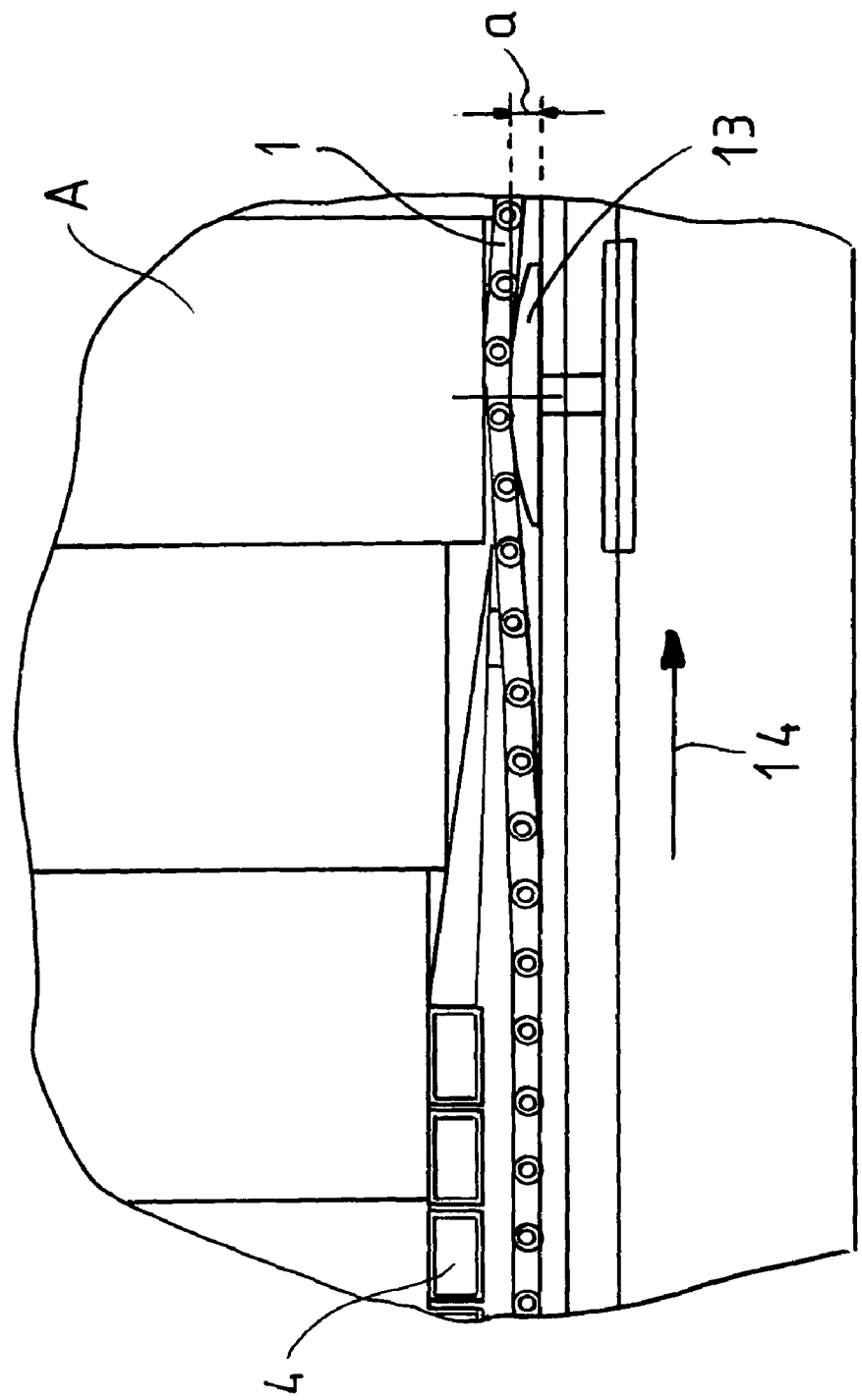
Figure 8:
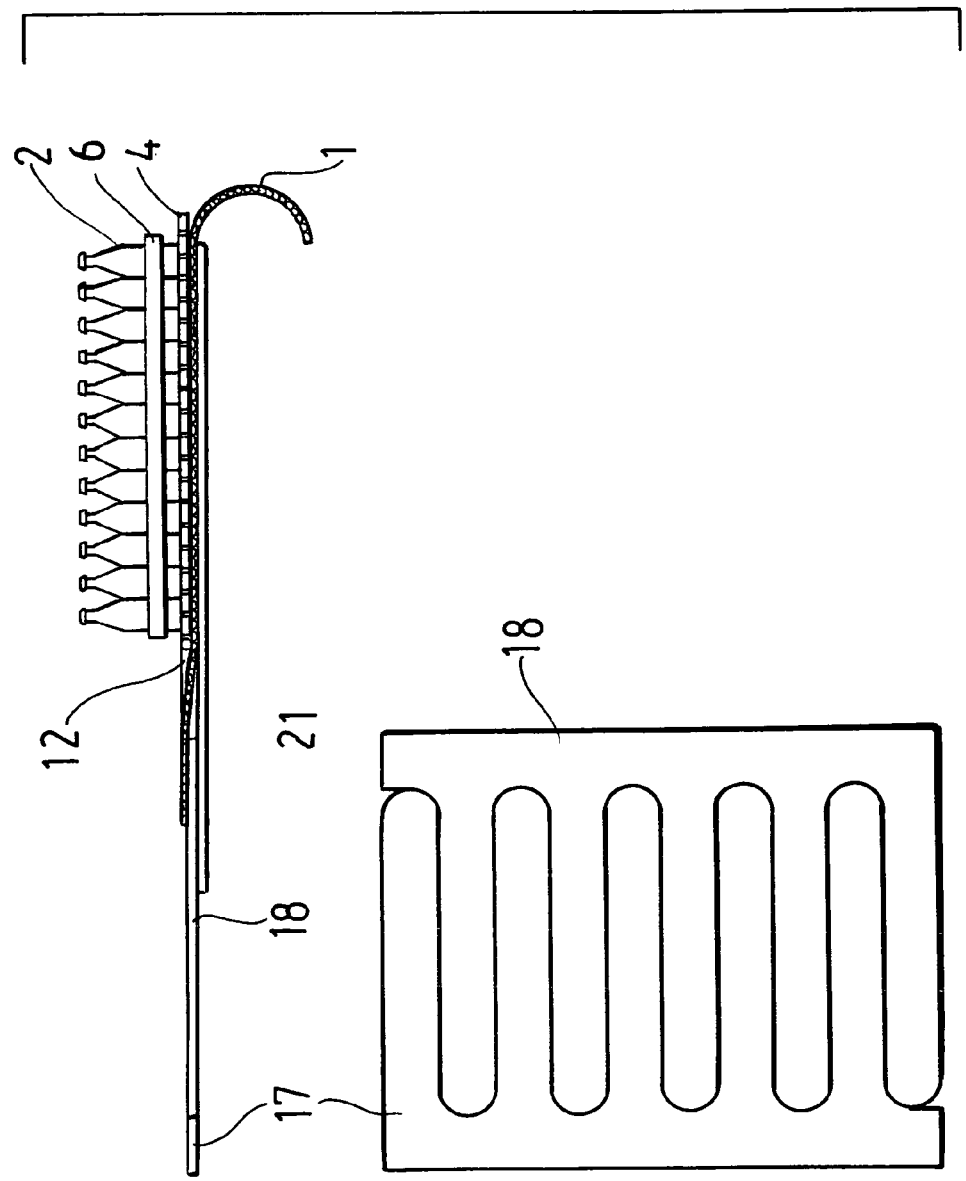
FIG. 8-FIG. 13 show a second embodiment of a device according to the invention.

As is suggested in particular in FIG. 5, the base lifting device 13 effects a local lifting of the base 1 by the height "a" (FIG. 7). Consequently, in the row A of containers 2, underneath which the transport surface 4 is relocated next, a clearance 15 is created on its side facing the transport surface 4 between the bottoms of the containers 2 of this row A and the base 1. This clearance 15 permits a simple engagement of the transport surface 4 underneath the containers 2 of this row A. This lifting continues row for row until the transport surface 4 has passed underneath all of the containers 2 of the layer and has thus reached its lifting position.

In the positions illustrated in FIG. 2 to FIG. 7, the transport surface 4 has been passed underneath approximately half of the rows of the layer. For better passing underneath, the front edge 12 of the transport surface 4 has a surface that runs downward to the free end and in a sloped manner downward to the base 1.

In FIG. 2 to FIG. 5, the base lifting device 13 is coupled with the transport surface 4 via a connecting element 16 that creates a constant spacing. So that the base lifting device 13 can be moved back into its initial position after reaching the lifting position of the transport surface 4 in a simpler manner, the base lifting device 13 is supported in the direction of the illustrated arrow so as to be capable of being lowered. This way, the base 1, due to the lowering of the lifter 13, is no longer lifted when the base lifting device 13 is moved back.

Figure 6:
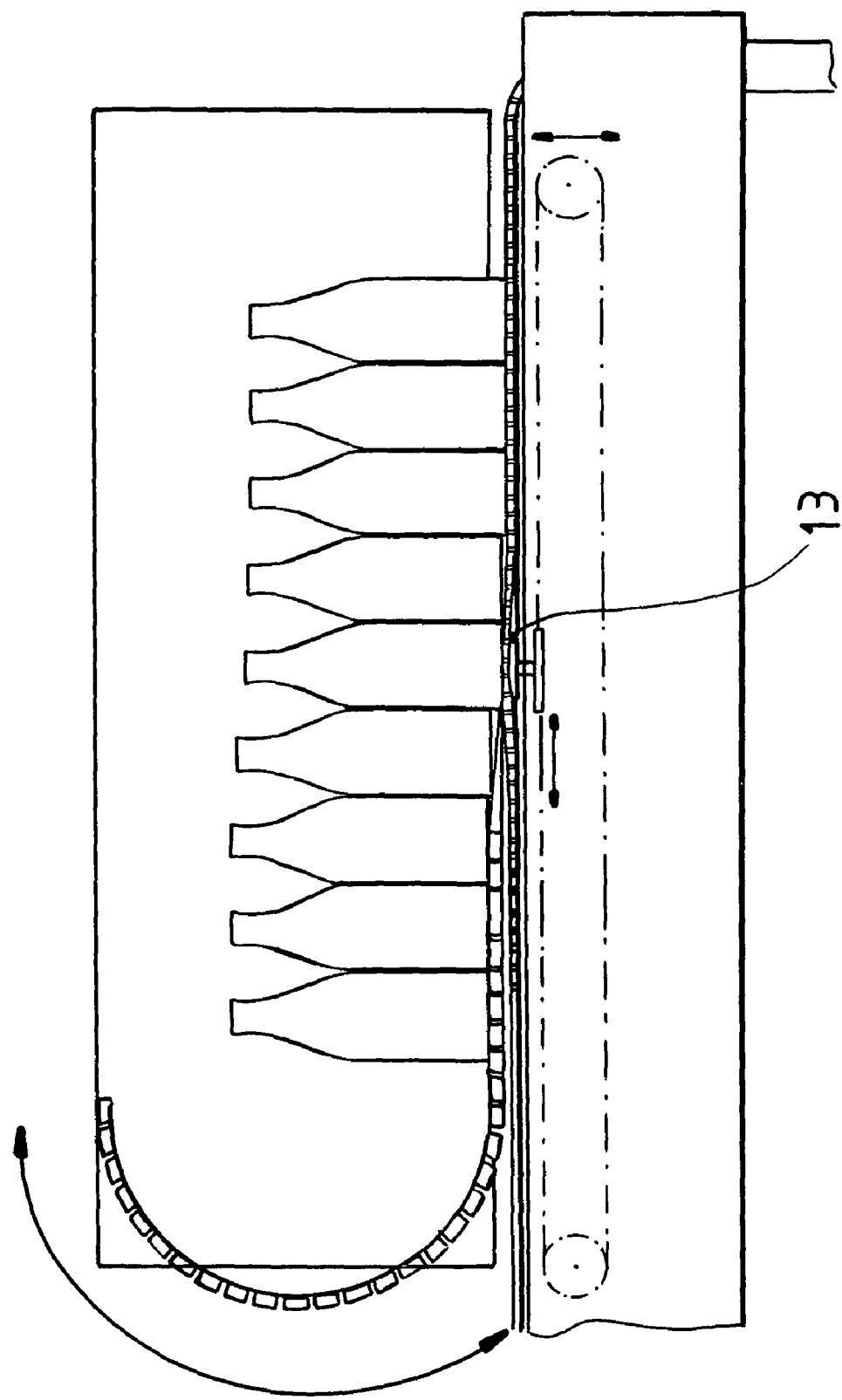

In FIG. 6 and FIG. 7, the base lifting device 13 can be displaced synchronously with the transport surface 4 via a separate drive.

FIG. 8 to FIG. 13 illustrate an alternative embodiment of a base lifting device 13. In this illustrated embodiment, the base lifting device 13 consists of two surface elements 17, 18 that are located in one plane with the edges of both of the surface elements 17, 18 pointing toward one another, and are formed as combs that have surface partial regions 19, 20 that are offset to one another and extend in the plane.

Contrary to the illustrated embodiment according to FIG. 4 to FIG. 7, in which substantially only the row A is lifted by the base lifting device 13, all of the containers 2 are located at the same height in the illustrated embodiment according to FIG. 8 to FIG. 13.

The surface elements 17, 18 are supported from underneath on a slide rail 21. The surface element 17 at the left-hand side in these figures is stationary, while the surface element 18 on the right-hand side in these figures can be moved synchronously with the transport surface 4. For this purpose, provision is made for an unillustrated drive, for example.

The relative position of the two surface elements 17, 18 to one another is illustrated in FIG. 8 to FIG. 11 in the left-hand lower region of the figure in top view. For reasons of simplification, FIG. 8 to FIG. 11 do not illustrate the conveyor belt on the side of the layer that is located opposite the transport surface 4 so that, because of this, the surface element 17 located underneath the conveyor belt is visible.

Figure 10:
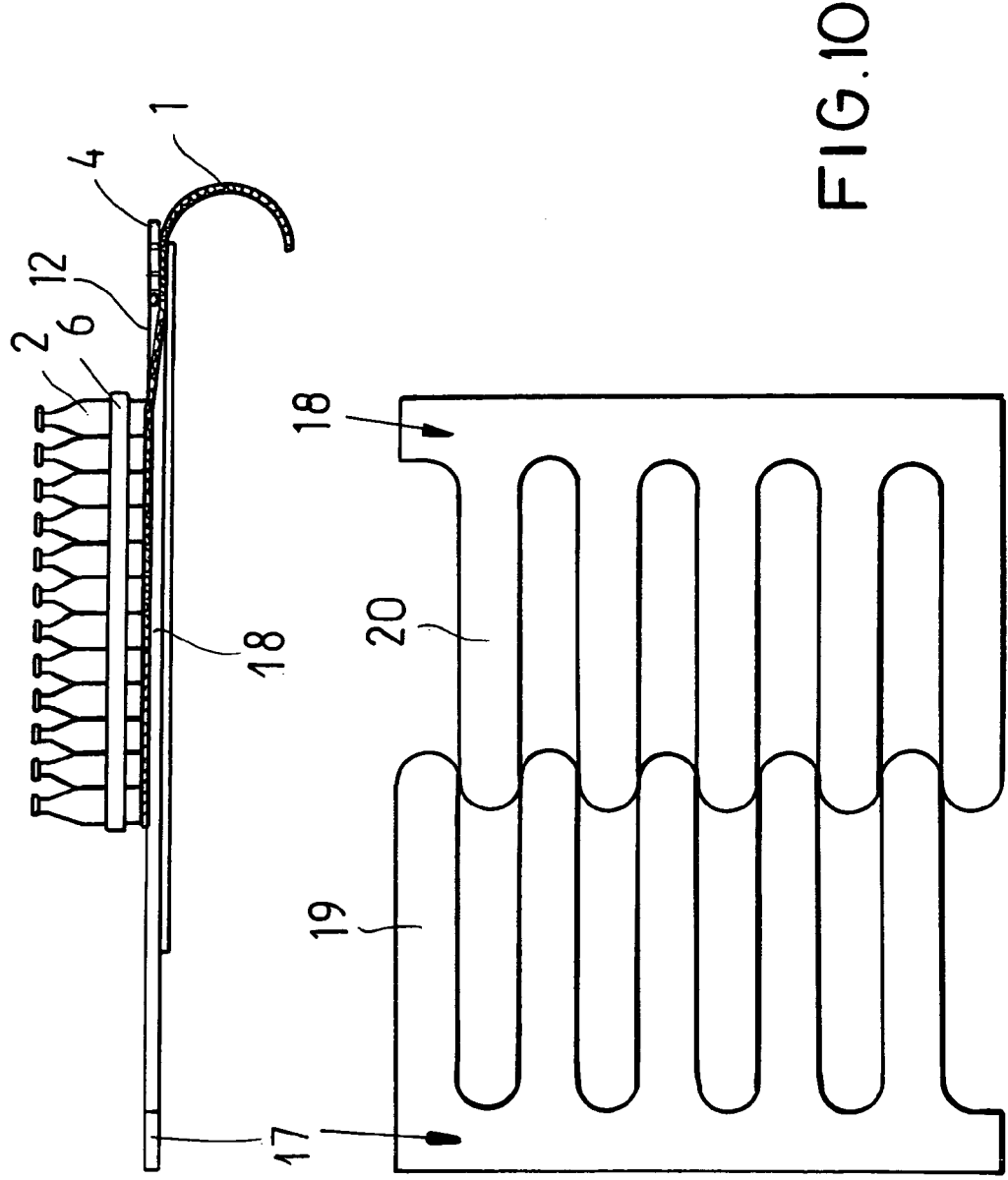

In FIG. 10, the surface elements 17, 18 are located in a mutually adjoining position. The transport surface 4 is then also not yet in its lifting position. The width of the surface partial regions 19, 20 is matched with the diameters of the containers 2. The smaller the diameters of the containers 2, the smaller the width of the surface partial regions 19, 20.

Figure 12:
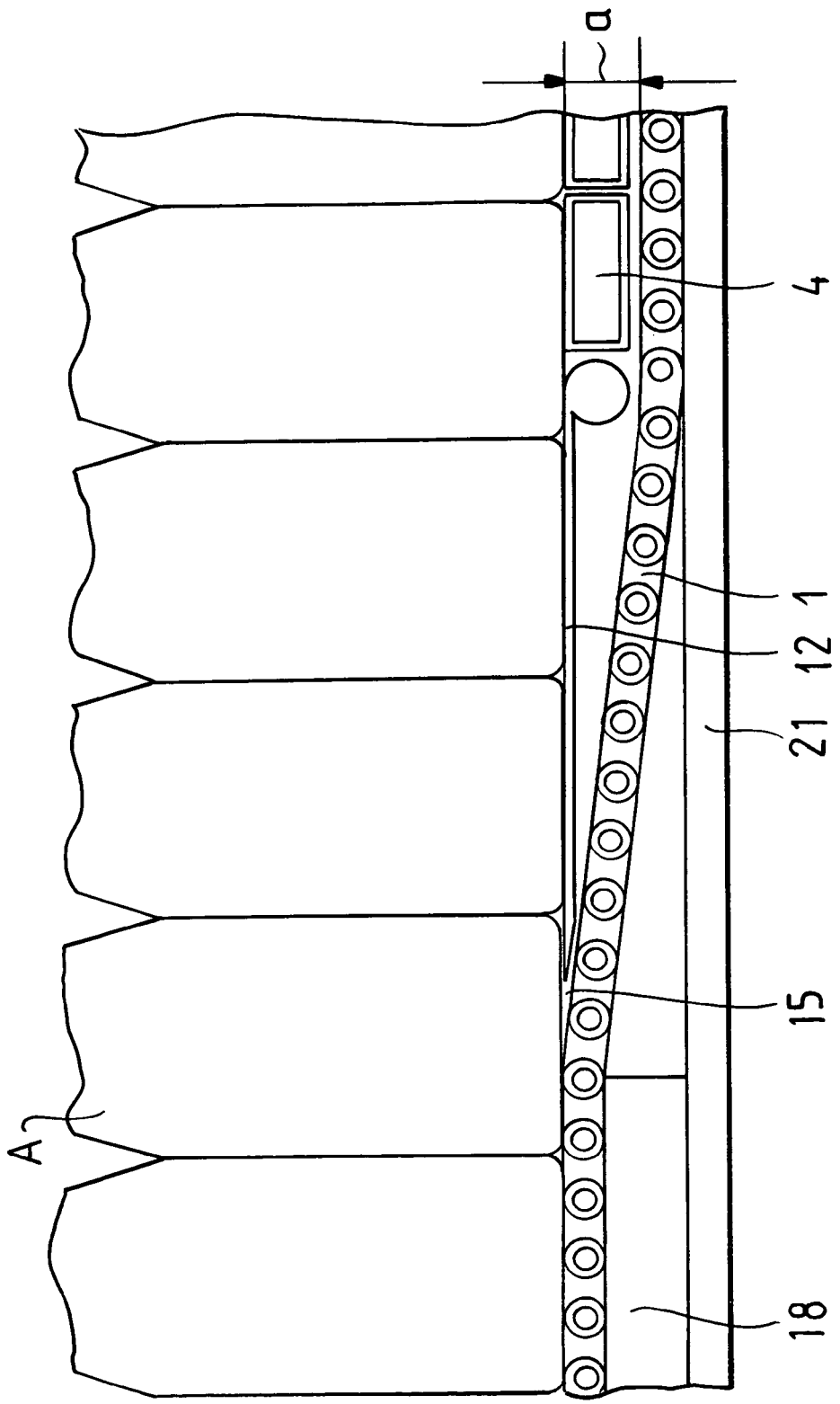

If the transport surface 4 is moved in the direction of the left surface element 17 together with the right surface element 18, that is, in conveyor direction 14 (FIG. 7), as is illustrated in FIG. 12, before the base 1 is lowered, a clearance 15 is created between the bottoms of the containers 2 of the row A and the base 1, underneath which the transport surface 4 is moved next, on its side facing the transport surface 4. The transport surface 4 can thus be guided underneath the containers 2 of this row A.

This clearance 15 is formed in that the conveyor belt in this region is lowered by the height "a" by the surface element 18. The lowering can be justified by the dead load of the base 1. However, it is also quite possible that the base 1 is guided downward by an unillustrated structure, e.g. in the form of a roller assembly, wherein this structure can be displaced synchronously in the direction 14 with the transport surface 4.

In the illustrated embodiment, the height "a" corresponds approximately to the height of the transport surface 4 and is approximately 20 mm in regions in which the transport surface 4 is located above the conveyor belt, the conveyor belt is in contact with the slide rail 21 and is thus lower by the height "a" than the regions that are in contact with the surface elements 17, 18, that is, the base lifting device 13. This also applies for the embodiment of the base lifting device 13 according to FIG. 2 to FIG. 7.

Figure 9:
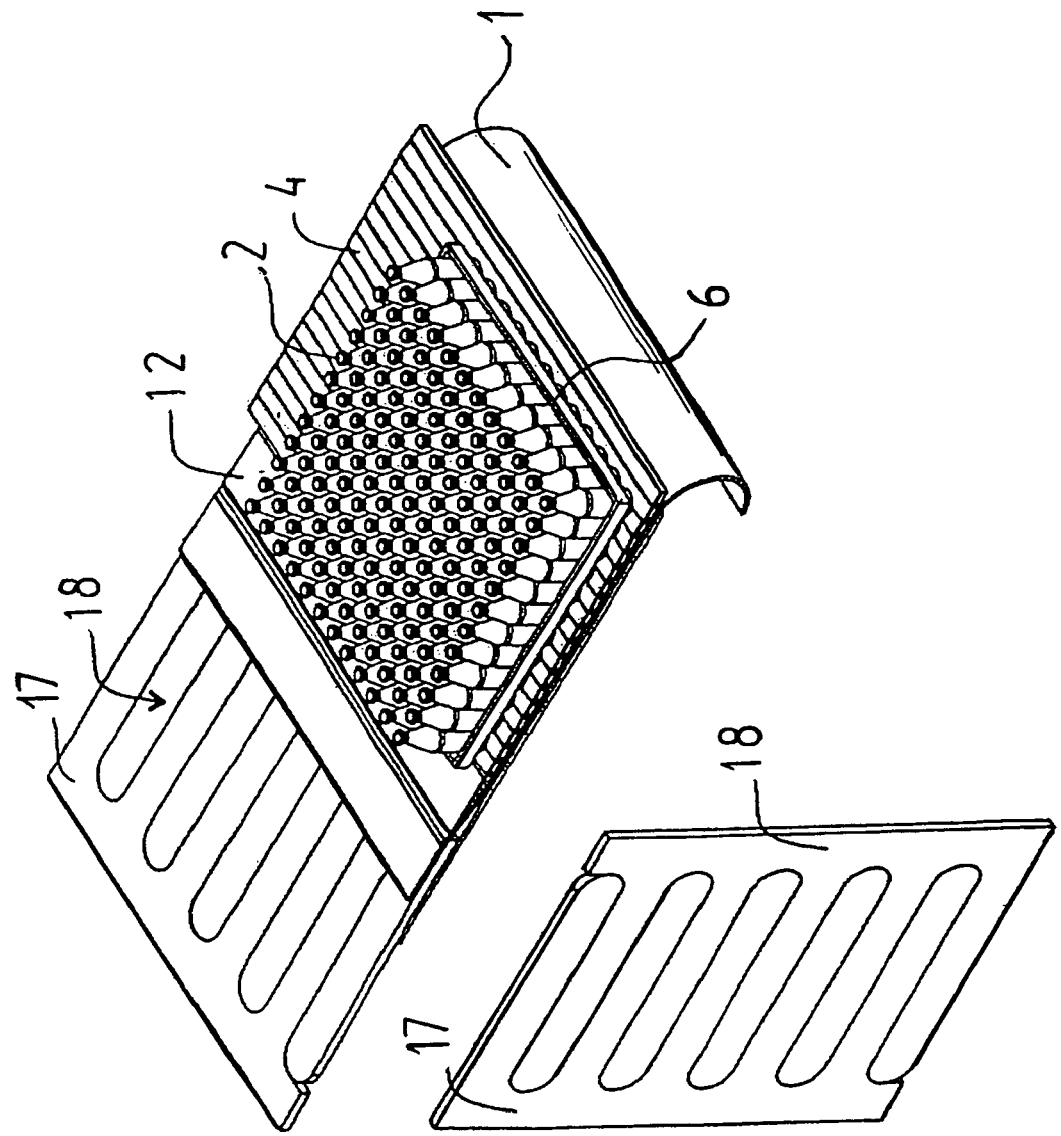
Figure 13:
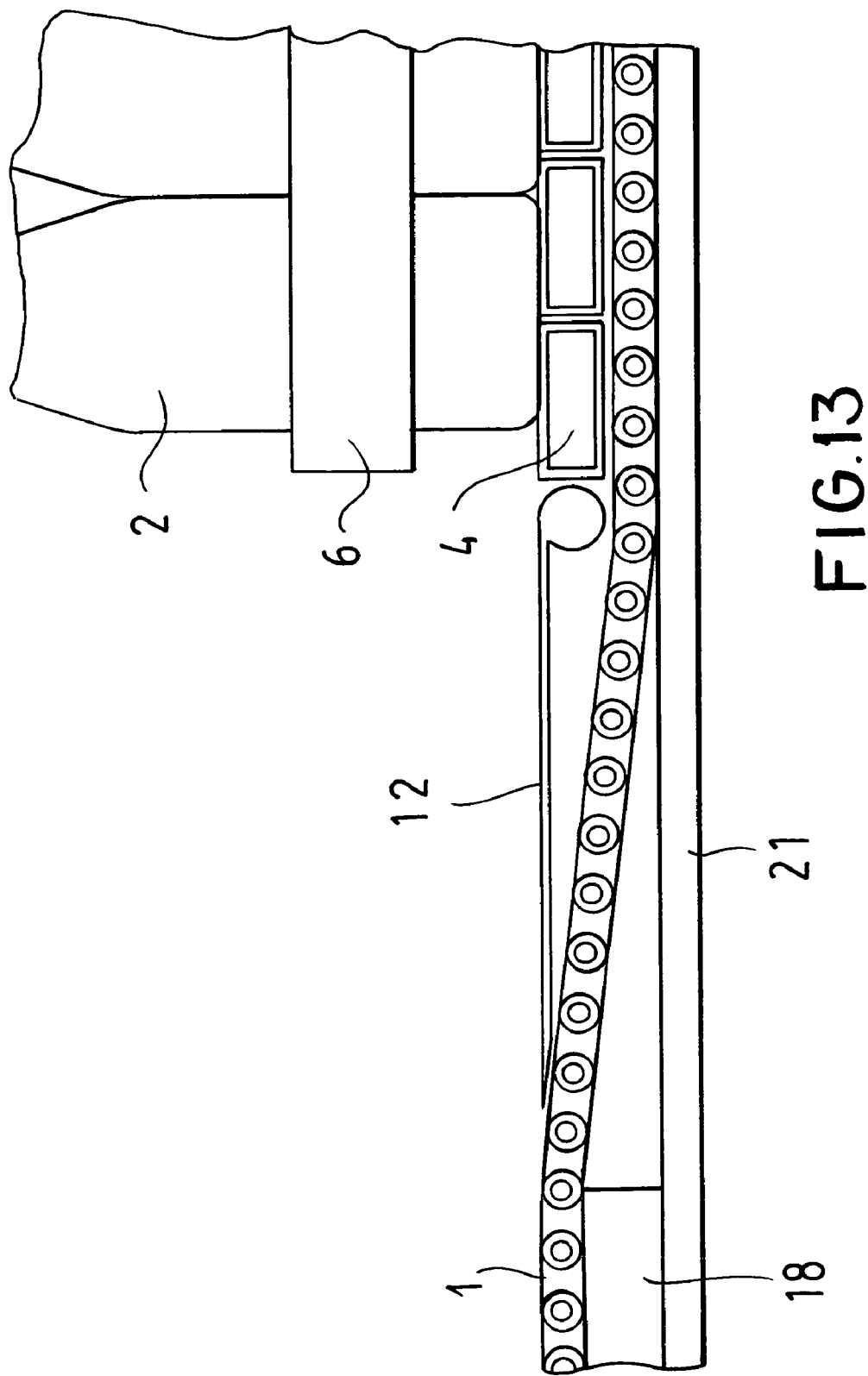
Figure 14:
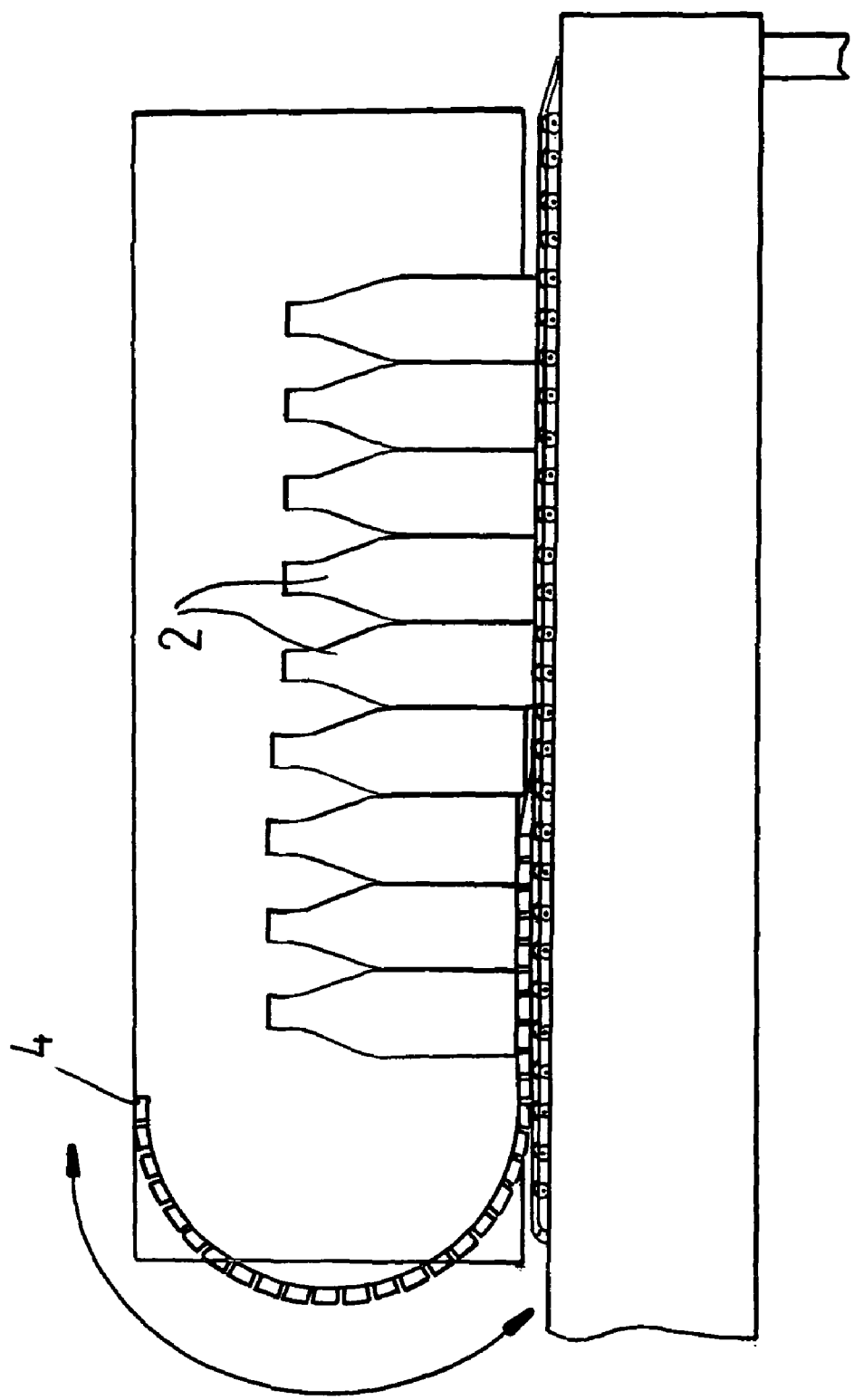
Figure 15:
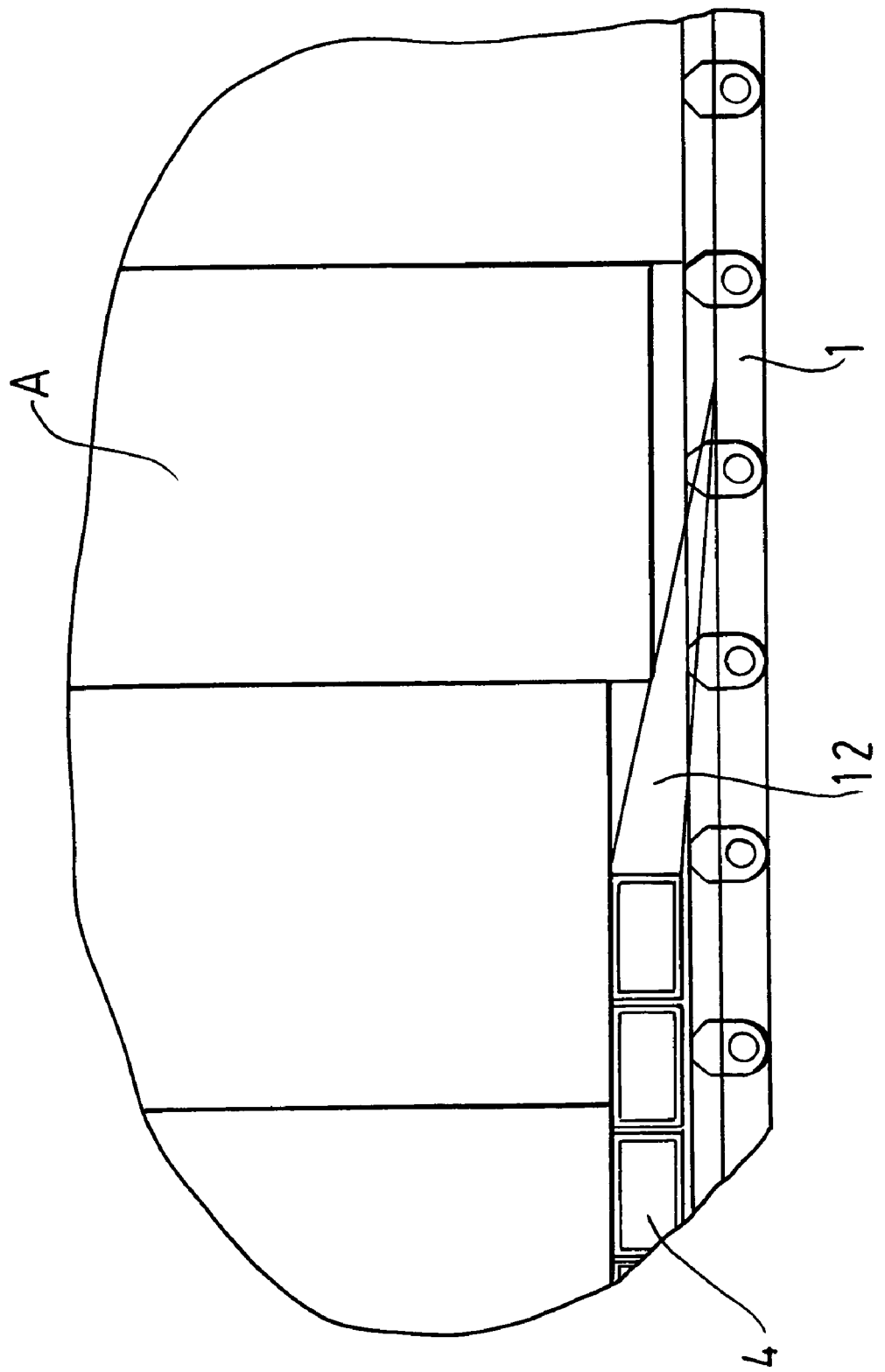
Figure 16:
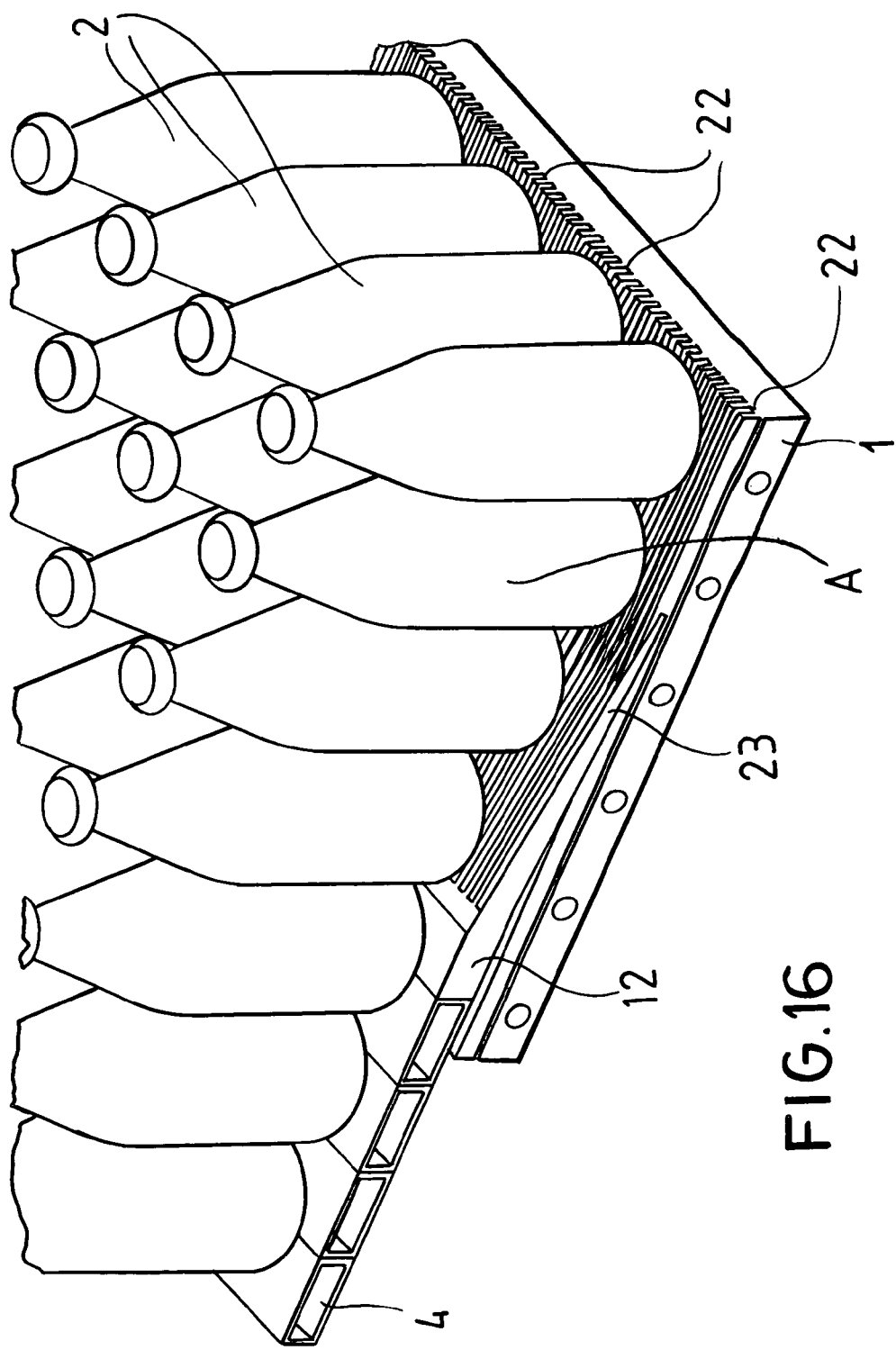
Figure 17:
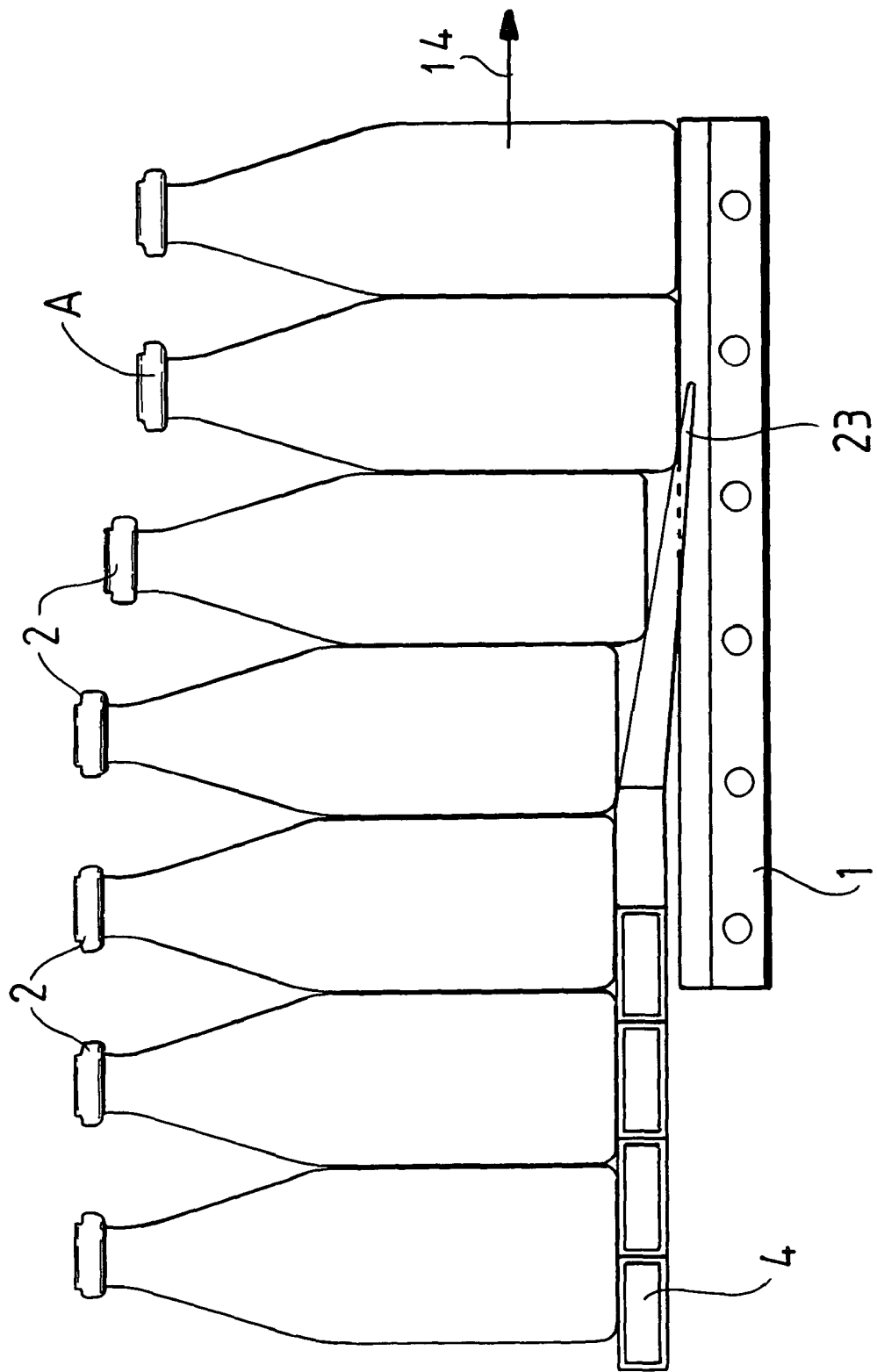

In FIG. 9 and FIG. 13, the transport surface 4 is in its lifting position, that is, it has been passed underneath all of the containers 2 of this layer. The surface elements 17, 18 are then also in the position, in which they are fitted into one another. The layer can then be lifted by the lifting device 3.

Figure 11:
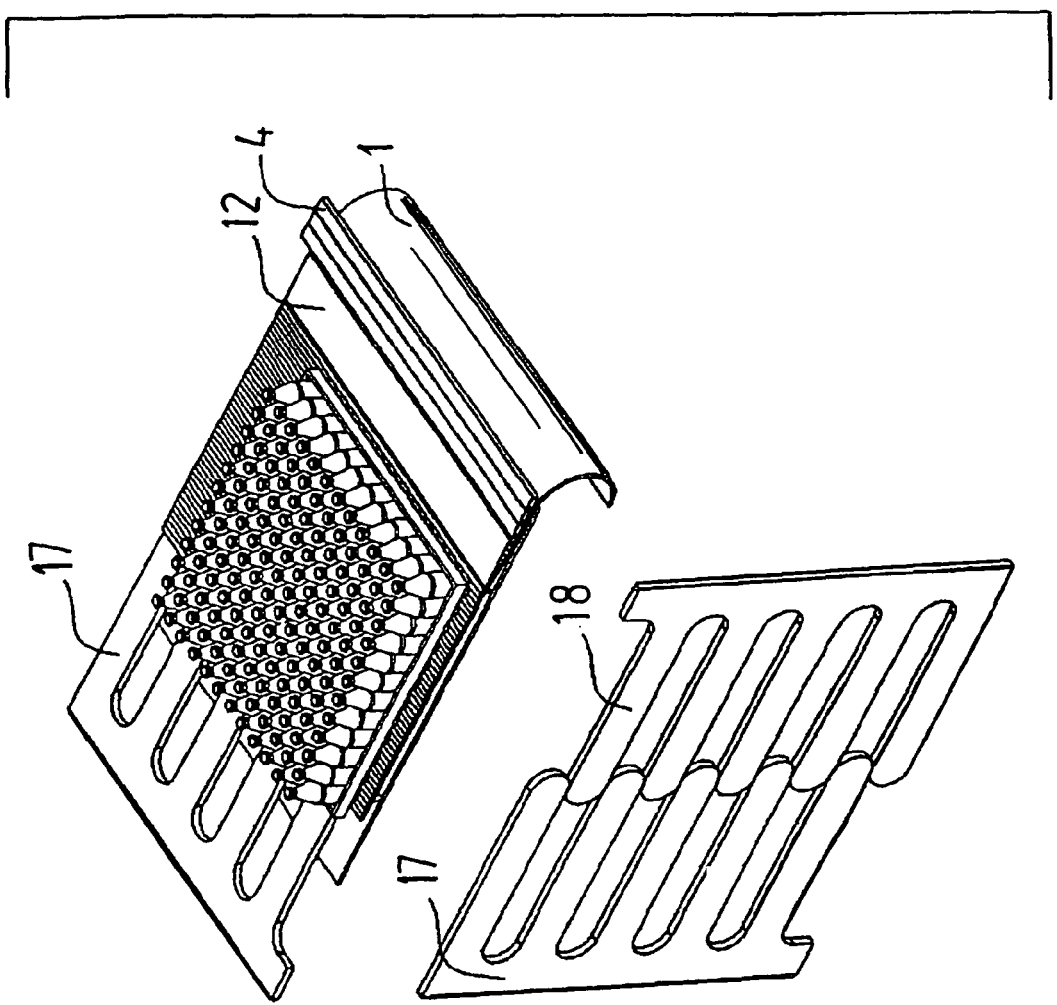

After the layer has been lifted by the lifting device 3, the right-hand surface element 18 is again relocated into the position illustrated in FIG. 10 and FIG. 11. A new layer of containers 2 is then piled up on the base 1 and the lifting device 3 comprising the frame 5 is positioned around the layer of container 2, with the transport surface 4 not yet located in the lifting position. By moving the right-hand surface element 18 together with the transport surface 4, the transport surface 4 can then again be passed underneath the layer.

Figure 19:
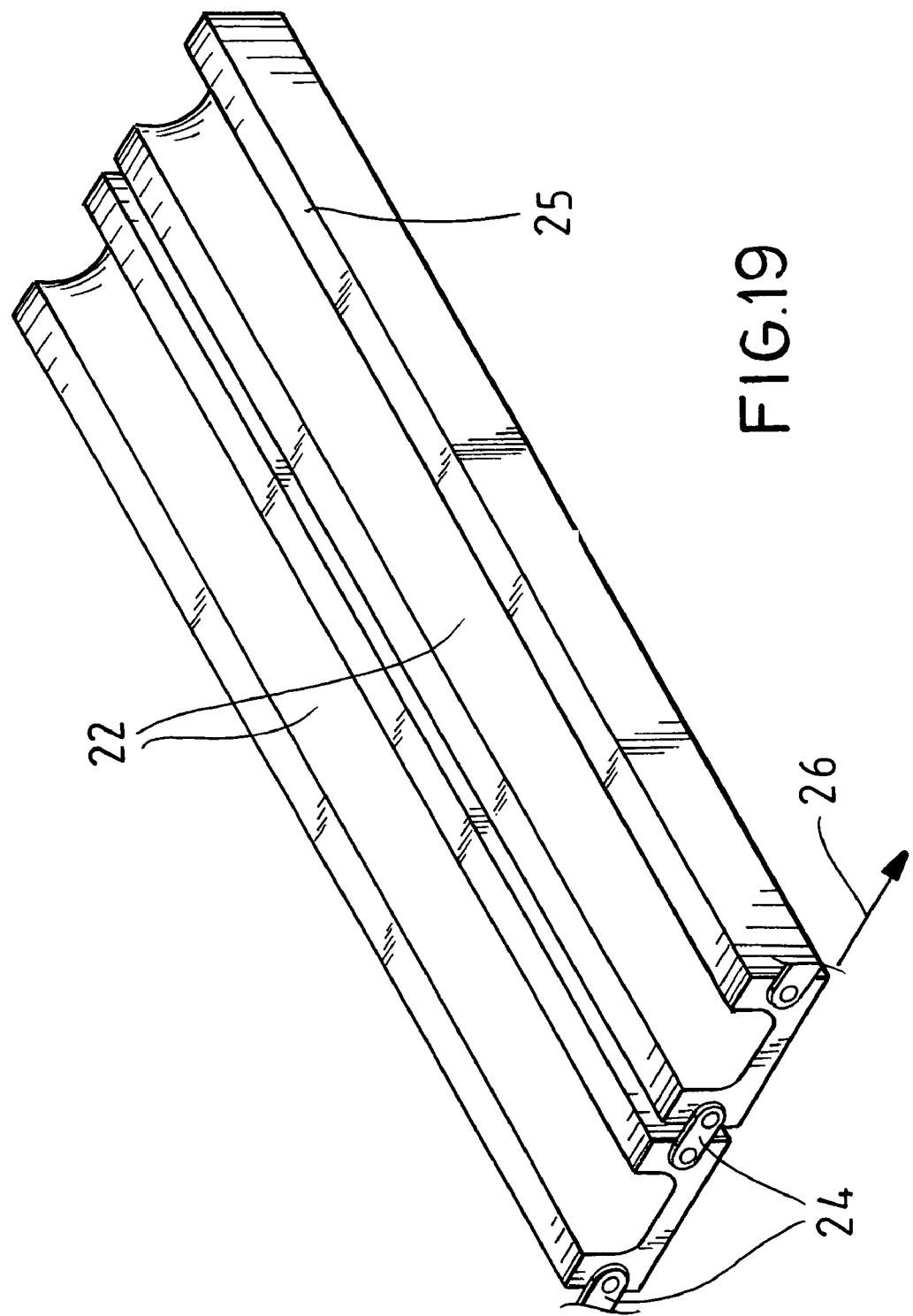
Figure 20:
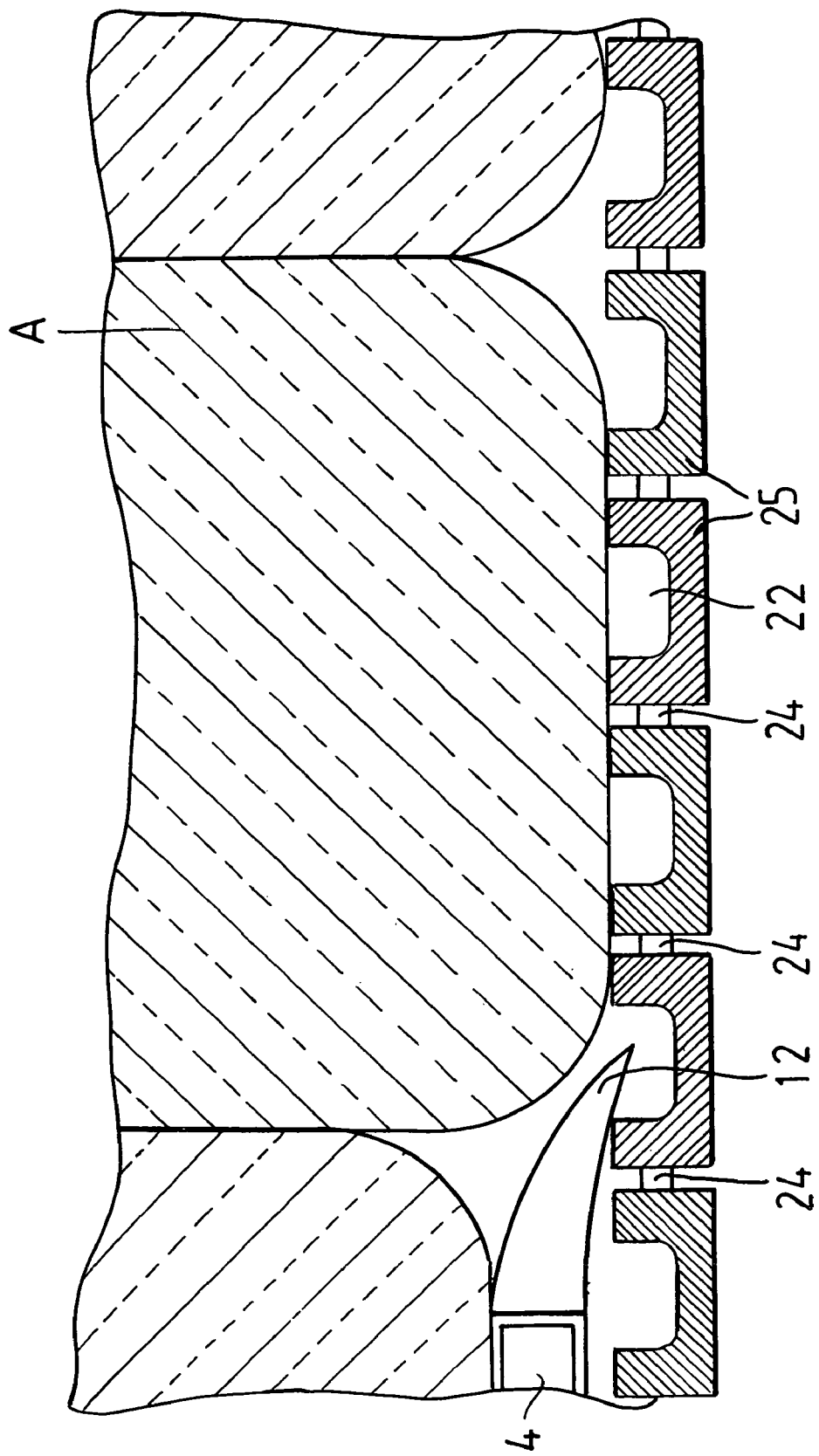

FIG. 14 to FIG. 18 on the one hand as well as FIG. 19 and FIG. 20 on the other hand, illustrate embodiments, where under the row A of containers 2, underneath which the transport surface 4 is relocated next, a clearance 15 is formed at least on its side facing the transport surface 4 between the bottoms of the containers 2 of this row A and the base 1.

In the embodiment according to FIG. 14 to FIG. 18, the base 1, that is, the conveyor belt, has on its surface facing the transport surface 4, groove-shaped recesses 22 that are oriented parallel to the conveyor direction 14. At the same time, the transport surface 4, at its front edge 12 in conveyor direction 14, has comb-shaped front edge regions 23 each fitting into a respective one of the recesses 22. The front edge regions 23 can be inserted into the corresponding recesses 22 and can moved therein. This can clearly be seen in the sloped top view in FIG. 16 as well as in the side view according to FIG. 17.

The spacing of the recesses 22 is matched with the size of the containers 2 that are to be lifted. In the embodiment illustrated in FIG. 16, provision is made for a plurality of recesses 22 underneath each container 2. By moving the transport surface 4 in the conveyor direction 14, the transport surface 4 can be easily passed underneath the layer, due to the guidance of the front edge region 23 in the recesses 22. In this illustrated embodiment, the base 1 can also be stationary. In FIG. 18, the front edge 12 of the transport surface 4 is illustrated from different directions. It can clearly be seen that the front edge 12 is embodied so as to run downward in a slanted manner so that the height from the front edge regions 23 to the transport surface 4 increases.

The embodiment of the base 1 can be variable. The base 1 can be stationary so that a relative movement between the base 1 and the transport surface exists in response to a movement of the transport surface 4.

However, the base 1 can also be embodied so as to be displaceable so that, on movement of the transport surface 4, the base 1 is moved either in the same direction or in the opposite direction with the transport surface 4.

According to FIG. 14 to FIG. 18, the base 1 can thus be embodied as a conveyor belt, for example that consists of a plurality of segments that are connected with one another in an articulated manner via elements by axles that are oriented perpendicular to the displacement direction.

A segment can be embodied to be continuous across the entire width of the base 1. However, it is also quite possible that a segment consists of a plurality of partial segments that are connected with one another, as viewed over the width of the base 1.

In FIG. 19 and FIG. 20, the base 1 is embodied as a conveying surface that can be moved in the displacement direction 26 and that consists of a plurality of segments 25 that are connected with one another in an articulated manner via elements 24 by axles that are oriented perpendicular to the displacement direction 26. On its upper side, each segment 25 has a recess 22 that is embodied as a groove extending orthogonally to the conveyor direction 14. When passing underneath, the front edge 12 of the transport surface 4 is located in a recess 22 so that the transport surface 4 can be slightly passed underneath the row of containers 2. In this embodiment, no relative movement should exist between the base 1 and the transport surface 4.

Figure 21:
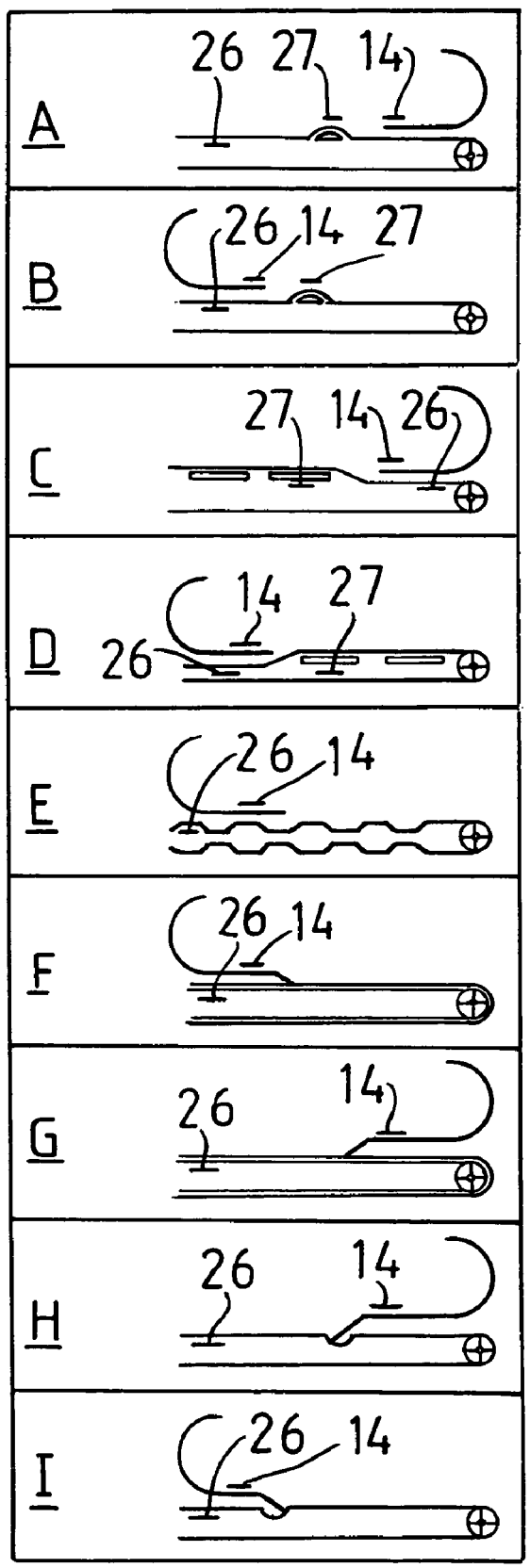
FIG. 21 shows views A to I for illustrating the possible directions of movement.

FIG. 21 illustrates possible directions of movement. The embodiment according to FIG. 2 to FIG. 7 is illustrated in views A and B. The displacement direction 26 of the base 1 can thus be identical with the conveyor direction 14 of the transport surface 4 and with the displacement direction 27 of the base lifting device 13 that is illustrated in view B.

It goes without saying that the displacement direction 26 of the base 1 can be opposite to the conveyor direction 14 of the transport surface and the displacement direction 27 of the base lifting device 13.

Possible directions of movement in a base lifting device 13 consisting of two surface elements 17, 18 are illustrated in views C and D. View C relates to the embodiment according to FIG. 8 to FIG. 13. In view D, the right-hand surface element 18 is disposed so as to be stationary, while the left-hand surface element 17 can be relocated. The conveyor direction 14 of the transport surface 4, the displacement direction 26 of the base 1 as well as the displacement direction 27 of the surface element 17 are then the same.

The directions of movement in the embodiment according to FIG. 19 and FIG. 20 are illustrated in view E.

The directions of movement in the embodiment according to FIG. 14 to FIG. 18 are illustrated in views F and G. As can be seen there, the conveyor direction 14 of the transport surface 4 can be in displacement direction 26 (view F) as well as opposite the displacement direction 26 (view G) of the base 1.

Views H and I illustrate an embodiment, in which the base 1 is "locally" lowered in the region that, on the one hand, borders on the row of containers 2, underneath which the transport surface 4 is relocated next and, on the other hand, faces the transport surface 4 that was not yet passed from below. The "lowered" region also moves around synchronously with the transport surface 4. Here, the conveyor direction 14 of the transport surface 4 can either be in the displacement direction 26 (view I) or opposite the displacement direction 26 (view H) of the base 1.

In the illustrated embodiments illustrated in the figures, the transport surface 4 embodied as a blind is guided in two U-shaped rails that are disposed at a spacing from one another and which are fastened to the lifting device 3. The distance is chosen to be such that the layer of containers 2 does not touch the rails. In particular for economy of space, the ends of the rails are deflected upward or downward, as illustrated in FIG. 8 to FIG. 13, for example.

The invention claimed is:

1. An apparatus for handling an array of objects, the apparatus comprising:
    a horizontal support defining and extending upstream against a conveyor direction from an accumulation region;
    a conveyor belt movable downstream in the conveyor direction on the support and defining a horizontal conveyor surface extending through the accumulation region;
    a frame at the accumulation region at a downstream end of the conveyor surface for gathering the objects at the downstream end into a group having a plurality of rows;
    a transport element formed as a blind of an array of slats, having an upstream end edge, and shiftable in the conveyor direction between a ready position with the end edge spaced downstream from the group and a pickup position underlying the entire group and atop the conveyor surface;
    means for shifting the transport element parallel to the conveyor direction and on top of the conveyor surface between the ready position and the pickup position;
    a stationary upstream spacer comb beneath the conveyor belt and atop the support upstream of the downstream end;
    a downstream spacer comb also beneath the conveyor belt, atop the support, between the upstream comb and the downstream end, interleaved with the upstream comb, forming with the upstream end edge a transversely extending and vertically open gap through which the conveyor extends,
    the downstream comb being coupled with the transport element for joint movement in the direction such that on movement upstream of the transport element and downstream comb the belt is lowered where it passes through the gap immediately upstream of the end edge of the transport element and the transport element is engageable between the objects in the group and the conveyor surface, whereby the transport element can slide underneath the objects in the group; and
    means for raising the transport element after it slides underneath the group and thereby picking the group of objects up off the conveyor surface.

2. The object-handling apparatus defined in claim 1 wherein the edge is wedge-shaped.

3. The object-handling apparatus defined in claim 1 wherein the transport element moves under the group without substantially moving the objects in the group horizontally relative to one another.

4. The object-handling apparatus defined in claim 1 wherein the end edge and the row extend transversely of the conveyor direction.

* * * * *